Figure 3:
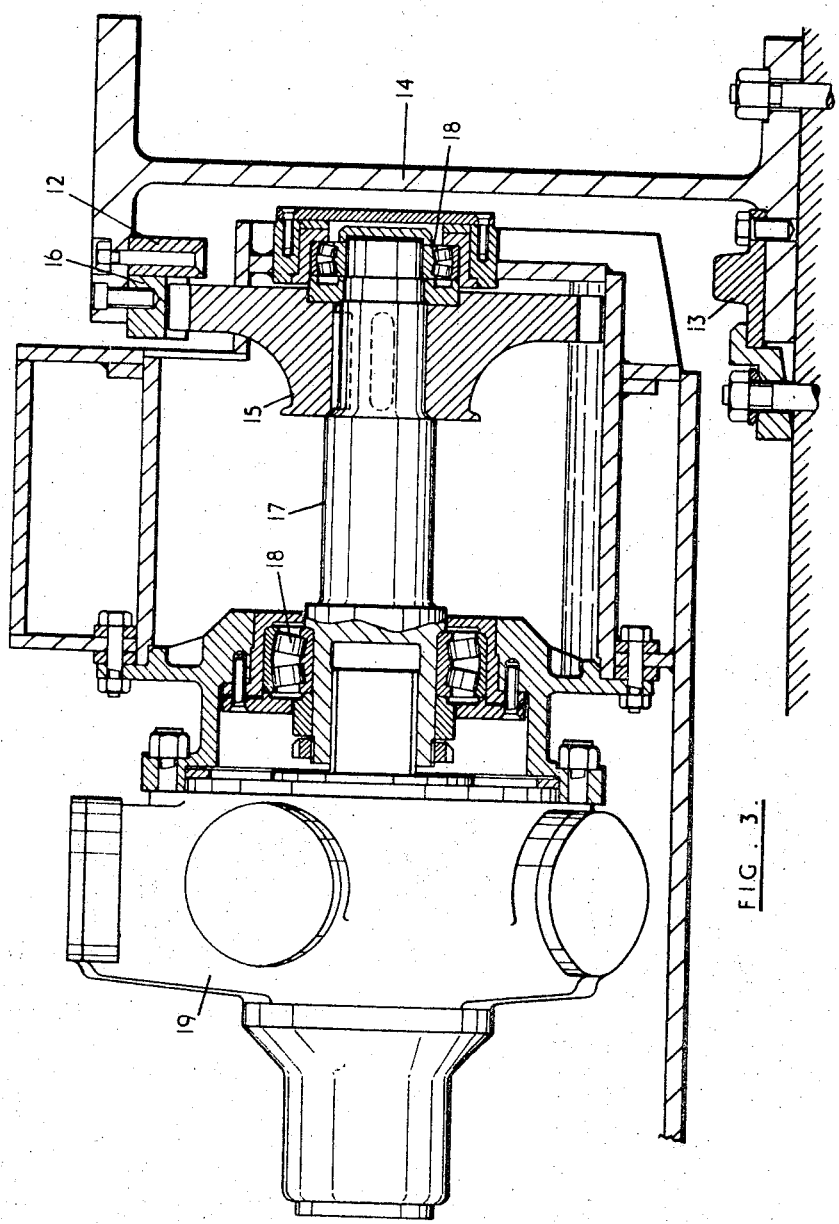

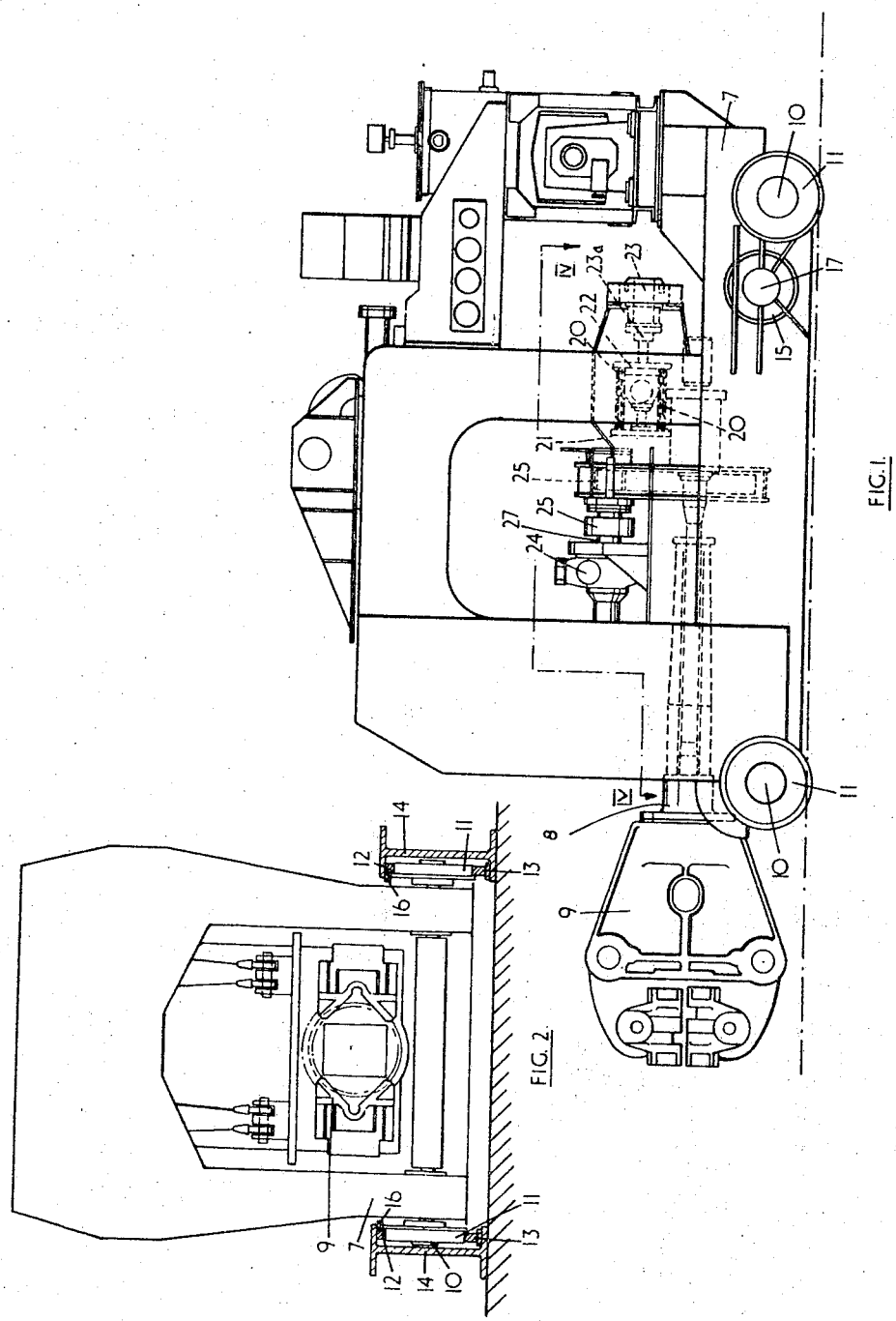

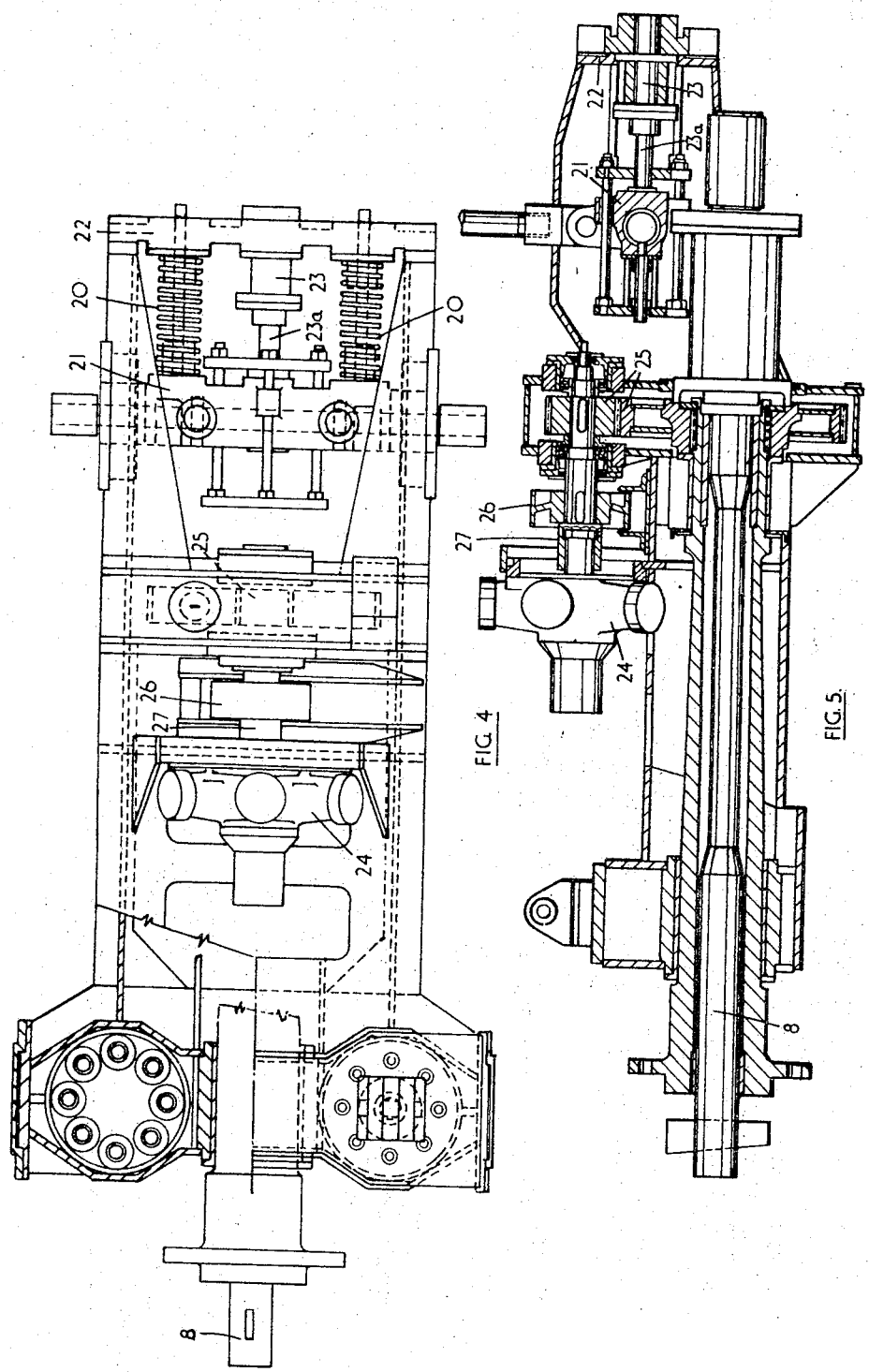

3,349,601
MANIPULATORS
Stanley Burrows, London, England, assignor to The Adamson-Alliance Company Limited, London, England, a British company
Filed June 15, 1964, Ser. No. 375,084
Claims priority, application Great Britain, June 19, 1963, 24,359/63
7 Claims. (Cl. 72—420)

This invention relates to manipulators, and more particularly to manipulators as used for handling elongated ingots during the forging thereof.

An object of the invention is to provide a manipulator in which the high acceleration necessary to move the ingot being forged the required distance between press strokes is readily obtained.

A further object of the invention is to provide a manipulator having a positive drive arrangement which resists any slowing of the wheeled carriage of the manipulator during operation.

According to the present invention there is provided a manipulator comprising a wheeled carriage, a peel mounted on the carriage for longitudinal movement relative thereto, jaws associated with the peel for gripping a workpiece, hydraulic means for positively effecting a high acceleration of the peel relative to the carriage on release of the workpiece from the press tool of a forging press, and hydraulic means for effecting intermittent movement of said carriage separate from and consecutive to the movement of the peel in such a manner that the compound motion of the peel and carriage causes a fresh portion of the workpiece to be presented to the press and the longitudinal movement of said peel is limited in motion to the preceding motion of the carriage.

Preferably, the manipulator comprises a wheeled carriage adapted for movement along spaced parallel rails, and a drive pinion mounted on each side of the carriage adapted to engage a longitudinally extending rack associated with each of said rails.

A method of forging in a forging press employing a manipulator having a wheeled carriage carrying a peel and associated jaws for gripping a workpiece to be forged comprising hydraulically effecting a high acceleration of the peel relative to the carriage on release of the workpiece from the press tool of a forging press, and hydraulically effecting intermittent movement of said carriage separate from and consecutive to the movement of the peel in such a manner that the compound motion of the peel and carriage causes a fresh portion of the workpiece to be presented to the press and the longitudinal movement of said peel is limited in motion of the preceding motion of the carriage.

An embodiment of the invention will now be described, by way of example, with reference to the accompanying drawings in which:

FIGURE 1 is a side elevation of a manipulator having a co-operating peel,

FIGURE 2 is an end elevation of the manipulator and peel of FIGURE 1, the jaws of the peel being shown at right angles to their position in FIGURE 1 for the sake of clarity, FIGURE 3 is a fragmentary sectional view showing the means by which the carriage of the manipulator is driven on its supporting rails, FIGURE 4 is a sectional plan view on the line IV—IV of FIGURE 1, and FIGURE 5 is a sectional view on the line V—V of FIGURE 4.

Referring to the drawings the manipulator indicated generally by the reference numeral 6 comprises a wheeled carriage 7 having a peel 8 mounted thereon which is capable of rotational movement about its axis and longitudinal movement relative to the carriage 7. One end of the peel 8 has a pair of jaws 9 for gripping the ingot to be forged in known manner.

The carriage 7 is mounted on axles 10, each of which has a wheel 11 keyed to the ends thereof which are guided for movement along and positioned between upper and lower rails or tracks 12 and 13 (see FIGURES 2 and 3) mounted, respectively, on the upper and lower inner flanges of I-section beams 14 positioned at each side of the manipulator. The wheels 11 run along the lower rails 13, whilst the upper rail 12, which is positioned with a small clearance above the wheels 11, reduces or prevents any vertical movement thereof which may be caused by upward forces on the manipulator.

As shown best in FIGURE 3, the carriage drive is provided by a pinion 15 positioned on each side of the carriage 7, each of which engages a longitudinally extending rack 16 mounted on the upper inner flange of each beam 14 adjacent the upper rail 12, this location of the racks 16 affording better protection from dust, scale and foreign matter than if they were positioned at floor level.

Each pinion 15 is mounted on a shaft 17 carried in anti-friction bearings 18 and is driven by a slow speed hydraulic motor 19. The pinions 15 may be mounted independently or coupled together by means of a cross-shaft.

Since the wheels 11 of the carriage 7 carry all the moving load and are mounted in pairs on the axles 10 to which they are keyed, the arrangement described above resists any slewing of the manipulator carriage 7 due to the frictional force between each wheel 1 and its associated rail.

By incorporating hydraulic driving motors 19 of low speed, the inertia moment of the carriage and drive is kept to a minimum. Braking torque may be obtained by causing the hydraulic motors 19 to act as pumps delivering oil back to a reservoir tank through spring-loaded relief valves (not shown).

Referring in particular to FIGURES 4 and 5, the peel 8 is mounted in known manner for longitudinal movement relative to the carriage 7 and is urged towards a normal central position by springs 20 (FIGURE 4) extending between a frame 21 holding the peel 8 and a portion 22 of the carriage 7. This arrangement allows forward and backward movement of the peel 8 under the applied horizontal forces resulting from lateral extension of the ingot when under a forging press and also permits movement of the manipulator relatively to the press during forging to allow rapid movement of the ingot when it is released by the press.

Also connected between the portion 22 of the carriage 7 and the peel supporting frame 21 is a small diameter hydraulic cylinder 23 and ram 23a whereby relative horizontal movement between the two parts can be effected as required. This movement is usefully employed at the beginning of the travel stroke of the manipulator when a fast advancement or retraction of the ingot relative to the press is required. It will be realised that modern high speed presses require rapid movement of the ingot between pressing strokes.

In order to obtain rotation of the manipulator and peel 8 and its associated jaws 9, a slow speed hydraulic motor 24 is coupled through gears 25 to the peel 8, ensuring minimum inertia moment of the driving system, as in the case of the carriage drive described above. The pistons of the hydraulic motor 24 are capable of being locked by the hydraulic fluid and adjustable relief valves (not shown) are provided to limit applied back torque on the motor to a predetermined amount. In order to retain the stationary position of the jaws and peel 8 and its jaws 9 as separate brake 26 is provided on the hydraulic motor shaft 27 of the hydraulic motor 24. The brake 26 is so arranged that with zero oil pressure the brake 26 is applied by means of springs (not shown), but as the oil pressure builds up, the brake is removed by means of a small oil cylinder and piston.

When using the manipulator as described above in conjunction with a high speed press and the press tool rises after a pressing operation and releases the ingot, an electrical signal causes a control valve in the hydraulic system to be operated to cause oil pressure to be applied to the hydraulic cylinder 24 to enable the following operational sequence to be achieved:

(1) Oil pressure is applied to the cylinder 23 to cause the peel 8 and its associated jaws 9 and the ingot which is held therein to be retracted from or advanced to the press against the action of the springs 20. The cylinder 23 is capable of moving the peel and load the full amount of travel which is required to present a fresh portion of the ingot to the press. During this movement of the peel 8 and its load it is moved from a datum position relative to the carriage 7 of the manipulator which remains substantially stationary.

(2) The press tool then descends and commences to squeeze the fresh portion of the ingot.

(3) The total oil delivery is made available to the hydraulic driving motors 19 which on downwards movement of the press are automatically caused to move the manipulator carriage 7 in the same direction as taken by the peel 8 until the springs 20 are once again returned to their neutral position.

In an alternative method of operation the hydraulic cylinder can be arranged to cause the peel and its ingot to be retracted by an amount approximately equal to only half the travel required to present a full fresh portion of the ingot to the press. In this case the sequence of operations is as follows:

(1) Oil pressure is applied to the peel displacing cylinder, causing the jaws and ingot which is held thereon to travel towards, or away from the press by an amount approximately equal to half the travel required for the next pressing operation.

(2) When the piston of the oil cylinder reaches the end of its stroke, the whole manipulator travels in the same direction until the full required travel is obtained.

(3) The press tool descends and proceeds to "squeeze" the ingot.

(4) The carriage continues to travel in the direction initiated at (2) above, but since the peel, jaws and ingot are held stationary by the press, the continued travel of the carriage merely serves to re-centre the piston of the peel-displacing cylinder by which time the carriage has decelerated to rest.

It will be seen that by the above methods of accelerating the peel and the carriage of the manipulator independently, the high acceleration necessary to move the ingot the required distance between press strokes is obtained.

What is claimed is:

1. A manipulator comprising a wheeled carriage, a peel mounted on the carriage for longitudinal movement relative thereto, jaws associated with the peel for gripping a workpiece, hydraulic means for positively effecting a high acceleration of the peel relative to the carriage on release of the workpiece from the press tool of a forging press, and hydraulic means for effecting intermittent movement of said carriage separate from and consecutive to the movement of the peel in such a manner that the compound motion of the peel and carriage causes a fresh portion of the workpiece to be presented to the press and the longitudinal movement of said peel is limited in motion to the preceding motion of the carriage.

2. A manipulator as claimed in claim 1, in which a piston and cylinder device connected between the peel and the carriage forms the hydraulic means for effecting a high acceleration of the peel relative to the carriage.

3. A manipulator as claimed in claim 1, in which there is provided spaced parallel rails along which the wheeled carriage can move, a drive pinion mounted on each side of the carriage, and a longitudinally extending rack associated with each of said rails, said pinions being arranged to engage said racks to effect movement of the carriage.

4. A manipulator as claimed in claim 3, in which there is provided a secondary upper rail spaced vertically above each rail on which the wheeled carriage is adapted to move and a beam provided with upper and lower flanges, the upper and lower rails being carried on the underside of the upper flange and the topside of the lower flange, respectively, of the beam, the upper rails being spaced from the wheels of the carriage but being sufficiently close to reduce or prevent any vertical movement of the wheels, the longitudinally-extending rack also being located on the underside of said upper flange.

5. A manipulator as claimed in claim 3, in which axles are provided on the carriage to which the wheels are keyed in pairs.

6. A manipulator as claimed in claim 1, in which an hydraulic motor or motors form the hydraulic means for effecting movement of the carriage.

7. A method of forging in a forging press employing a manipulator having a wheeled carriage carrying a peel and associated jaws for gripping a workpiece to be forged comprising hydraulically effecting a high acceleration of the peel relative to the carriage on release of the workpiece from the press tool of a forging press, and hydraulically effecting intermittent movement of said carriage separate from and consecutive to the movement of the peel in such a manner that the compound motion of the peel and carriage causes a fresh portion of the workpiece to be presented to the press and the longitudinal movement of said peel is limited in motion of the preceding motion of the carriage.

References Cited

UNITED STATES PATENTS

| | | | |
|---|---|---|---|
| 1,541,539 | 6/1925 | Webb | 105—154 |
| 1,810,698 | 6/1931 | Diescher | 72—189 |
| 2,439,986 | 4/1948 | Rennie | 105—154 |
| 2,769,298 | 11/1956 | Jones | 56—328 |
| 3,126,770 | 3/1964 | Wuppermann | 214—1 |
| 3,141,559 | 7/1964 | Dragonuk | 214—1 |
| 3,274,819 | 9/1966 | Knowles | 72—421 |

FOREIGN PATENTS

| | | |
|---|---|---|
| 1,028,869 | 3/1953 | France. |
| 1,088,784 | 9/1960 | Germany. |

CHARLES W. LANHAM, *Primary Examiner.*

G. P. CROSBY, *Assistant Examiner.*